April 19, 1949.  W. H. CASTAY  2,467,609
FILM SPLICING DEVICE

Filed June 21, 1945  3 Sheets-Sheet 1

INVENTOR.
Walter H. Castay
BY John H. Ruckman
attorney

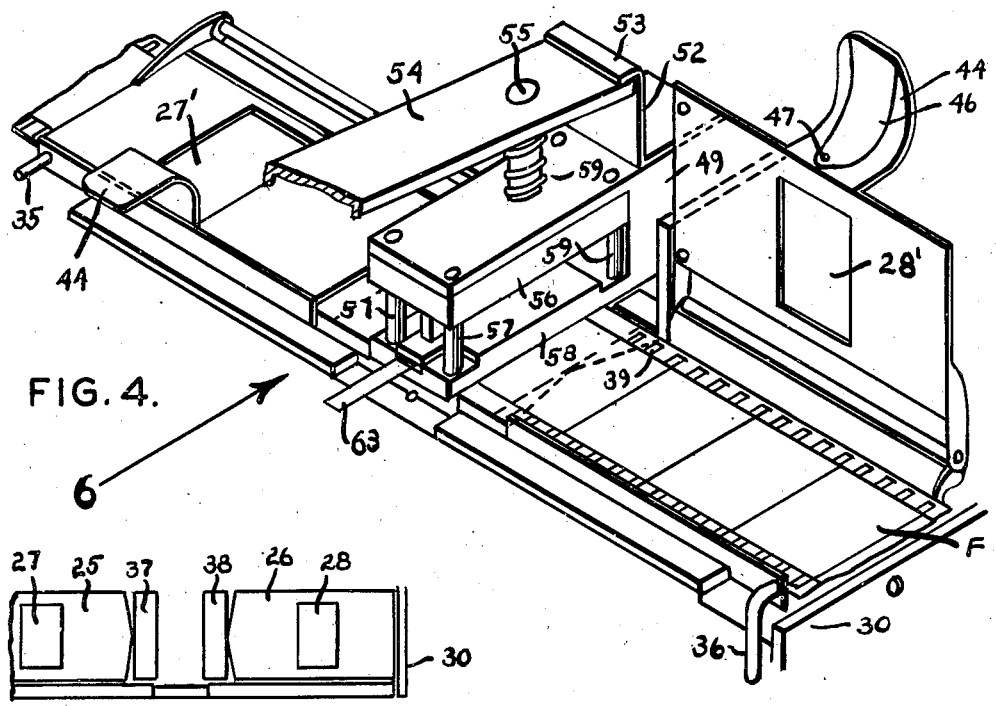
FIG. 4.
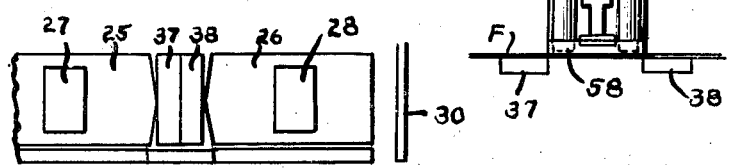
FIG. 5.
FIG. 6.
FIG. 8.
FIG. 7.
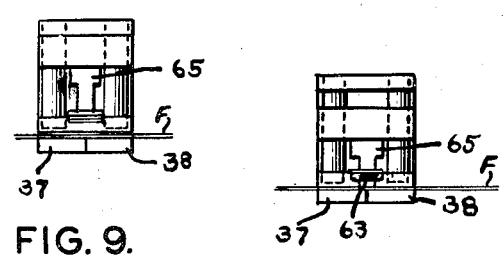
FIG. 9.       FIG. 10.

April 19, 1949. W. H. CASTAY 2,467,609
FILM SPLICING DEVICE
Filed June 21, 1945 3 Sheets-Sheet 3

INVENTOR.
Walter H. Castay
BY John H. Ruckman
Attorney

Patented Apr. 19, 1949

2,467,609

UNITED STATES PATENT OFFICE 2,467,609

FILM SPLICING DEVICE

Walter H. Castay, New Orleans, La.

Application June 21, 1945, Serial No. 600,701

1 Claim. (Cl. 154—42.1)

My invention relates to film splicing devices. While intended for use more particularly for splicing motion picture film, it is to be understood that this device may be used for splicing other types of film.

An object of this invention in general is to provide an efficient and convenient device and method of making cuts and splices in film with a minimum amount of effort and inaccuracy and without the requirement of any great degree of skill, so that the splicing can be satisfactorily performed by persons who have no special training for this kind of work. A special object of the invention is to provide a device and method by which the cut ends of film may be properly joined together without requiring the delicate operation of scraping the emulsion from the cut ends.

The novel features, which I believe to be characteristic of this invention, are set forth with particularity in the appended claim. The invention itself, however, both as to organization and operation, together with additional objects and advantages thereof, will be best understood from the following description of a specific embodiment when read in connection with the accompanying drawings in which—

Fig. 4 is an isometric view of a portion of the device showing a section of film in place and ready to be cut, this view being on an enlarged scale.

Fig. 5 is a top fragmentary view showing the film carrier in position for the film to be cut.

Fig. 6 is a fragmentary front view looking in the direction of the arrow 6 in Fig. 4 showing the film in position for cutting by a punch in cooperation with dies.

Fig. 7 is a view corresponding to Fig. 6 but showing the punch operated to make a cut.

Fig. 8 is a top view showing the film carriers in position for splicing the cut film.

Fig. 9 is a front view showing the film in position for splicing.

Fig. 10 is a view corresponding to Fig. 9 but showing the splice being made.

Figure 1:
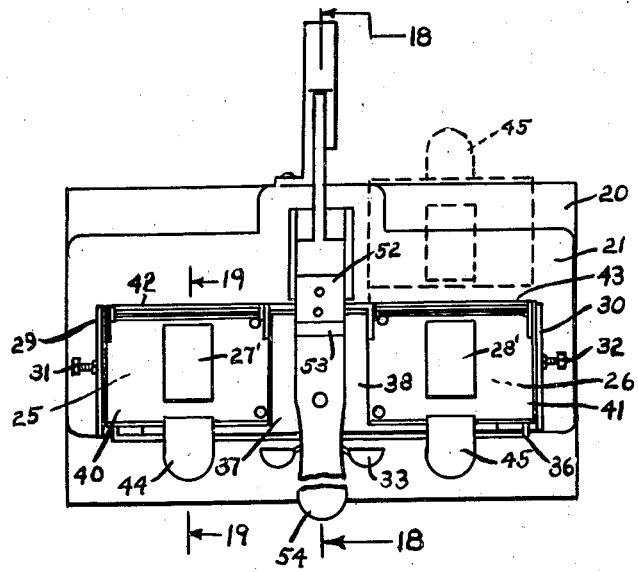
Fig. 1 is a top view of the device.
Figure 2:
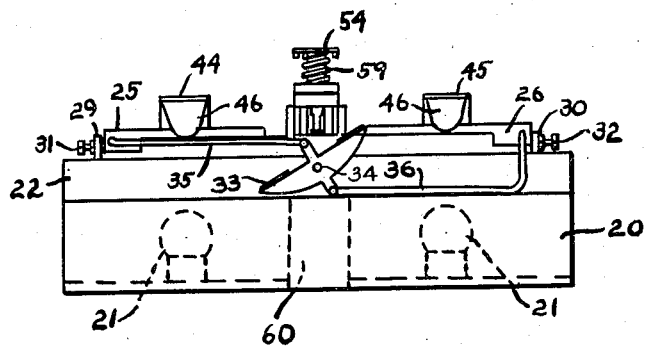
Fig. 2 is a front side view thereof.

Referring to the construction shown in the drawings for the purpose of illustrating the principles involved in this invention, the numeral 20 as best shown in Fig. 2 designates a casing which constitutes a base for the device and which contains light bulbs 21. A frame member 22 is secured to the top of the casing 20 and is provided with track-ways 23 and 24 shown in Fig. 19 in which the flanged bottom of two film carriers 25 and 26 shown in Fig. 1 may be slid toward and away from each other, so that in one extreme position they will be separated from each other by a space equal to the length of one film picture, and in the other extreme position they will butt against each other. These carriers are provided with openings 27 and 28, respectively shown in Figs. 5 and 8, each opening corresponding in shape with that of one picture section. In order that the two film carriers when separated may be spaced from each other exactly the length of one picture section, the ends of the frame 22 have upstanding flanges 29 and 30 through which adjustable stops 31 and 32 extend.

In order to slide the film carriers backwardly and forwardly, a double crank member 33 is centrally pivoted at 34 to the frame member 22. One crank arm of the member 33 shown in Fig. 2 is connected by a rod 35 with the carrier 25 while the other crank arm is connected by a rod 36 with the carrier 26. The opposed ends of the carriers 25 and 26 are provided, respectively, with die members 37 and 38 integral therewith slightly depressed below the upper surface of the carriers. Back of the dies 37 and 38, the carriers are provided with upstanding pins 39 for engaging in the feed perforations at the sides of the film, as shown in Fig. 4. These pins serve, after a picture section has been cut out, for feeding the two cut ends of the film into butted position.

Figure 19:
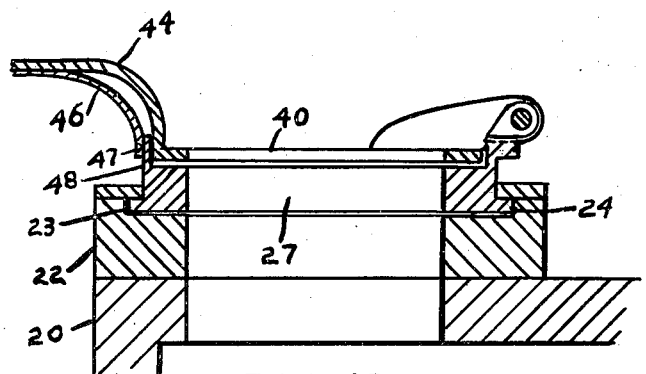
Fig. 19 is a view on an enlarged scale taken in vertical section on the line 19—19 of Fig. 1.

Clamping plates 40 and 41 are hinged at 42 and 43, respectively, to the back side of the frame member 22. These plates at their front are provided with finger pieces 44 and 45, respectively. These finger pieces at their front carry spring members 46 as shown in Figs. 4 and 19, the lower ends of which have struck out projections 47 adapted to engage with outstanding flanges 48 positioned at the front of the film carriers. The clamping plates 40 and 41 serve to hold the film in place for the cut at the time when the film carriers 25 and 26 are separated from each other. The clamping plates 40 and 41 are provided with openings 27' and 28' which are in register with the openings 27 and 28 so that the film is illuminated by light which comes up through these openings from the bulbs 21. After the cut in the film has been made, in the manner later to be described, these plates insure that the cut ends of the film will be fed toward each other in order that a butt splice may be made, in a manner now to be described.

Figure 3:
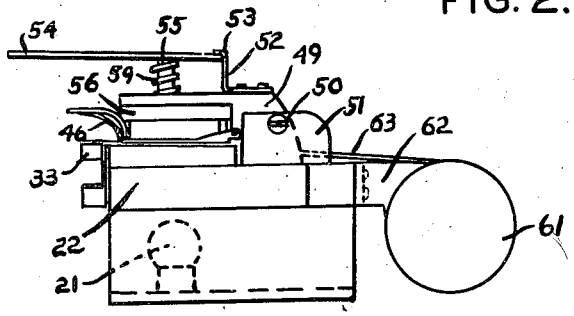
Fig. 3 is an end view thereof.

As best shown in Figs. 3 and 4, an angular member 49 is pivoted at 50 to projections 51 extending up from the frame. The member 49 carries an angle member 52 having a forwardly extending flange 53. A hand-operated lever 54 has its rear end positioned under the flange 53. A downwardly extending rod 55 is secured to the lever 54 and passes through a hole in the member 49 with a block 56 secured to the lower end of the rod. This block is adapted to slide up and down on posts 57 whose lower ends are secured to a punch 58 which extends forwardly from the member 49. The upper ends of these posts are secured to the upper portion of the member 49. The lever 54 is normally held in upward position by a coiled spring 59 surrounding the rod 55 and interposed between this lever and the forward extension of the member 49. When the film carriers are in separated position (as shown in Fig. 5) and the member 49 is moved on its pivot 50 downwardly from raised position, the punch 58 carried thereby will co-act with the two die numbers 37 and 38 to make a shearing out of one picture section from the film as it is held on the carriers 25 and 26. This cut out section is then free to drop through the chute 60 which is in the middle of the casing 20.

Figure 16:
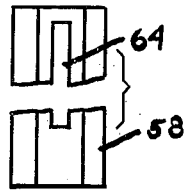
Fig. 16 is a bottom view of the punch.
Figure 17:
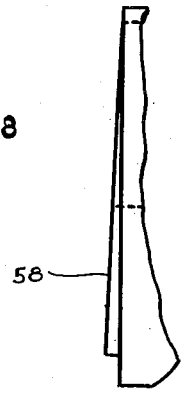
Fig. 17 is a side view thereof.
Figure 18:
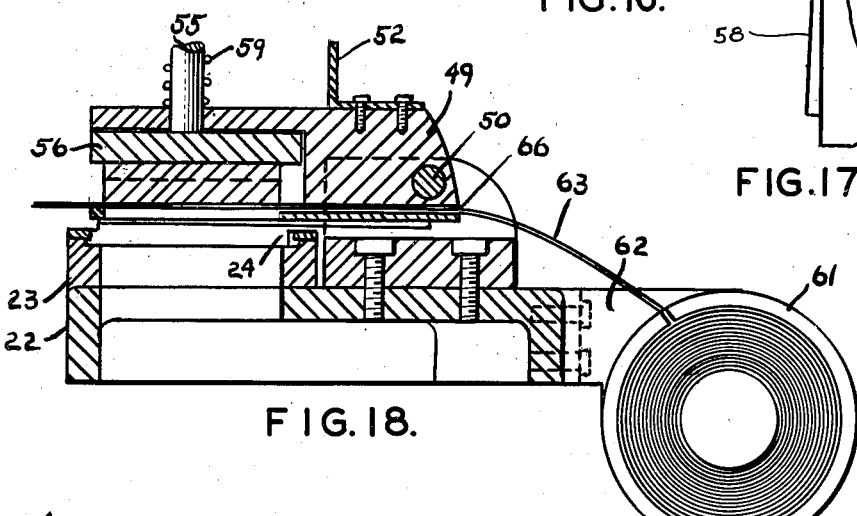
Fig. 18 is a view on an enlarged scale taken in vertical section on the line 18—18 of Fig. 1.

As shown in Figs. 3 and 18, a housing 61 is secured to the back of the frame 22 by a bracket 62. This housing constitutes a magazine for a roll of narrow plain film 63. The punch 58 is provided with a narrow slot 64 as shown in Fig. 16 the length of which is the same as the width of the picture film. The block 56 has a presser member 65 shown in Figs. 9 and 10 the end of which has a shape and size to pass nicely through the slot 64. Now, when the punch 58 has operated to cut out a picture section (as shown in Fig. 7), the crank arm member 33 is turned to bring the film carriers into engagement with each other with the two pieces of cut film clamped thereon so that the cut ends are butted together, as shown in Figs. 9 and 10. A little quick drying adhesive is put over the place where these cut ends meet and then the narrow film 63 is pulled through a slot 66 in the angular member 49, as shown in Fig. 18, and placed upon the adhesive so as to be over the butted ends of film. The hand lever 54 is forced down to put the lower end of the member 65 into firm engagement with the film 63. It will be noted from Fig. 18 that the member 65 is so shaped that it will cut the film 63 to the proper length of splice. Since this film has no coating of emulsion, no scraping is necessary and only a short time of applied pressure by the pressure foot is sufficient to make a strong splice for the butted ends of the two pieces of film.

Figure 11:
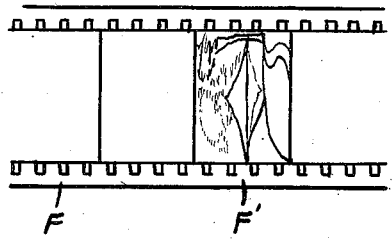
Fig. 11 is a top view of the film ready for cutting.
Figure 12:
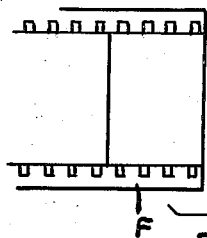
Fig. 12 is a top view of the film after being cut.
Figure 12:
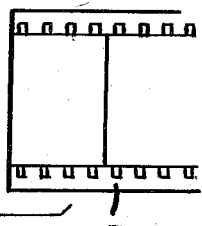
Figure 13:
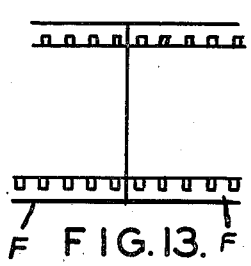
Fig. 13 shows the cut portions of film butted together for splicing.
Figure 14:
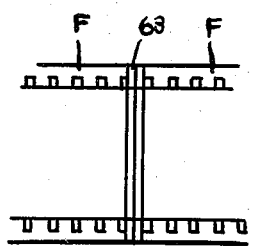
Fig. 14 shows the film after it has been spliced.
Figure 15:
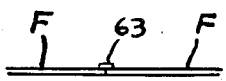
Fig. 15 is an enlarged edge view of the film after it has been spliced.

The operation and advantages of my invention will be obvious from the foregoing description and have, to a large extent, been indicated. Fig. 11 shows the film "F" ready to have a picture section F" cut therefrom. Fig. 12 shows the film after the cutting operation. Fig. 13 shows the cut portion of film butted together. Fig. 14 shows that the film strip 63 has been applied to make the splice. Fig. 15 is a fragmentary enlarged view of the film after it has been spliced.

Referring more in detail to the operation of the device, it should be noted that when the die members 37 and 38 are in separated condition and the punch 58 is depressed to cut the picture film, the splicing film 63 has not yet been drawn forwardly through the slot 66. Therefore the presser member 65 will pass downwardly in the slot 64 of the punch 58 without contacting the splicing film. The spring 59 is then allowed to lift the punch 58 as well as the presser 65. When the adhesive has been applied to the butted ends of the picture film, the splicing film is drawn forwardly above the adhesive. Now when the lever 54 is again depressed, the presser 65 not only cuts the splicing piece out of the film 63 but also presses this piece firmly upon the cement. During this time, the punch 58 simply rests over the dies 37 and 38 and on the upper surface of the picture film.

I claim:

In a film splicing device, the combination of a casing, a frame member secured to the top of said casing, two film carriers, clamping plates for said carriers hinged to said frame member for movement toward and away from said carriers, projections extending up from said frame member, an angular member pivoted to said projections, an angle member carried by said angular member and having a forwardly extending flange, a hand operated lever having its rear end under said flange, a rod attached at one end to said lever, a block to which the other end of said rod is attached, posts on which said block is slidable, a punch secured to the lower ends of said posts, and two die members with which said punch is adapted to co-act to shear out one picture section from the film as it is held on said carriers.

WALTER H. CASTAY.

REFERENCES CITED

The following references are of record in the file of this patent:

UNITED STATES PATENTS

| Number | Name | Date |
|---|---|---|
| 1,175,449 | Hirsch | Mar. 14, 1916 |
| 1,396,895 | Stolz | Nov. 15, 1921 |
| 1,459,822 | Carleton | June 26, 1923 |
| 1,489,261 | Malizia | Apr. 8, 1924 |
| 1,535,129 | Monacelli et al. | Apr. 28, 1925 |
| 1,730,929 | Flynn | Oct. 8, 1929 |
| 2,346,874 | Russell | Apr. 18, 1944 |